(12) United States Patent
Huang et al.

(10) Patent No.: US 10,694,269 B2
(45) Date of Patent: Jun. 23, 2020

(54) OPTICAL CABLE IDENTIFICATION TOOL

(71) Applicant: QUANTA COMPUTER INC., Taoyuan (TW)

(72) Inventors: Chao-Lan Huang, Taoyuan (TW); Tsu-Tai Kung, Taoyuan (TW); Hou-Lung Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/105,524

(22) Filed: Aug. 20, 2018

(65) Prior Publication Data
US 2020/0059710 A1    Feb. 20, 2020

(51) Int. Cl.
| | | |
|---|---|---|
| *H04B 10/07* | (2013.01) | |
| *H04Q 11/00* | (2006.01) | |
| *H04B 10/50* | (2013.01) | |
| *H04B 10/25* | (2013.01) | |

(52) U.S. Cl.
CPC ........ *H04Q 11/0005* (2013.01); *H04B 10/07* (2013.01); *H04B 10/25* (2013.01); *H04B 10/502* (2013.01); *H04J 2203/0012* (2013.01); *H04Q 2011/0037* (2013.01); *H04Q 2011/0052* (2013.01)

(58) Field of Classification Search
None
See application file for complete search history.

(56) References Cited

U.S. PATENT DOCUMENTS

| | | | | |
|---|---|---|---|---|
| 7,623,784 | B1* | 11/2009 | Pan | H04B 10/07 398/58 |
| 8,184,933 | B1* | 5/2012 | Aybay | G02B 6/3895 385/100 |
| 8,351,747 | B1 | 1/2013 | Aybay | |
| 2007/0296553 | A1* | 12/2007 | Tokita | H04B 10/40 340/10.51 |
| 2008/0159738 | A1* | 7/2008 | Lavranchuk | G02B 6/3895 398/17 |
| 2008/0166131 | A1* | 7/2008 | Hudgins | H04B 10/40 398/117 |
| 2012/0000977 | A1* | 1/2012 | German | H04Q 1/138 235/375 |

(Continued)

OTHER PUBLICATIONS

Extended European Search Report for EP Application No. 19151360.5, dated Jul. 15, 2019.

*Primary Examiner* — Li Liu
(74) *Attorney, Agent, or Firm* — Nixon Peabody LLP

(57) ABSTRACT

Systems and methods are provided for determining whether an optical cable matches a port on a switch device. The present disclosure can provide for a switch device which includes a cable identification tool. The cable identification tool can be configured to receive a port configuration table from a management device. The switch device can then obtain features of at least one cable attached to a port of the switch device. The switch device can then compare the obtained features with a table entry in the port configuration table to yield a comparison result. The table entry can correspond to the port to which the at least one cable is attached. Based on the comparison result, the switch device can generate one or more notifications. The notifications can indicate a match status of the at least one cable to the port.

18 Claims, 3 Drawing Sheets

(56) References Cited

U.S. PATENT DOCUMENTS

| | | | |
|---|---|---|---|
| 2013/0148976 A1* | 6/2013 | Patel | H04B 10/25 398/116 |
| 2014/0173156 A1* | 6/2014 | Alshinnawi | G06F 13/36 710/305 |
| 2015/0086211 A1* | 3/2015 | Coffey | H04B 10/40 398/116 |
| 2015/0219869 A1* | 8/2015 | Anderson | G02B 6/4452 385/135 |
| 2016/0301575 A1* | 10/2016 | Jau | H04L 41/12 |
| 2018/0006726 A1* | 1/2018 | Kim | H04B 10/2504 |
| 2018/0234174 A1* | 8/2018 | Courter | H04B 10/071 |

\* cited by examiner

OPTICAL CABLE IDENTIFICATION TOOL

FIELD

The present invention relates to optical cable detection, and more specifically, to systems and methods for determining whether an optical cable matches a port on a switch device.

BACKGROUND

Computing equipment, like servers, can be located in a server rack. In some configurations, server racks can employ top-of-rack switching, which is a network architecture designed to allow servers and other electronic appliances to connect to an in-rack network switch. Typically, a switch can sit at the top of a server rack for easy accessibility and cable management. Cables connect each server in the server rack to the switch. The switch can then connect to an external data center network. This design allows for short, in-rack connections between each server and the switch. A single, longer connection is then provided between the switch on the server rack and the data center network. Alternative designs for server racks are more expensive and rely on individual connections between each server and the external data center network.

Due to all these connections between servers on the rack, the switch, and an exterior data center network, rack assembly operators need to manage a large number of cables within the server racks. Further, operators need to correctly identify which cable can be used for which connection in the server racks. Operators typically rely on labels on both sides of a cable to identify the proper connection between the server and the switch. However, in spite of the reliance on these labels, human error still occurs. Therefore, what is needed is a mechanism to reduce or eliminate errors in connecting cables between servers and a switch.

SUMMARY

The various examples of the present disclosure are directed towards devices and methods for determining whether an optical cable matches a port on a switch device. A first embodiment comprises a switch device. The switch device can include a cable identification tool. The cable identification tool can be configured to receive a port configuration table from a management device. The switch device can then obtain features of at least one cable. The switch device can then compare the obtained features with a table entry in the port configuration table to yield a comparison result. The table entry can correspond to the port of the at least one switch. Based on the comparison result, the switch device can generate one or more notifications. The notifications can indicate a match status of the at least one cable to the port.

A second embodiment of the present disclosure can provide a method for identifying a match status of a cable by a cable identification tool on a switch device. The method can comprise first receiving a port configuration table from a management device. The method can then provide for obtaining features of at least one cable. The method can then provide for comparing the obtained features with a table entry in the port configuration table to yield a comparison result. The table entry can correspond to a port of the switch device. Based on the comparison result, the method can provide for generating one or more notifications indicating a match status of the at least one cable to the port.

A third embodiment of the present disclosure can provide for a non-transitory machine-readable medium. The non-transitory machine-readable medium can have stored instructions for performing a method of identifying a match status of a cable by a cable identification tool. The non-transitory machine-readable medium can comprise machine executable code which, when executed by at least one machine, causes the machine to perform a series of steps. The machine can first receive a port configuration table from a management device. The machine can then obtain features of at least one cable. The machine can then compare the obtained features with a table entry in the port configuration table to yield a comparison result. The table entry can correspond to a port of the switch device. Based on the comparison result, the machine can generate one or more notifications indicating a match status of the at least one cable to the port.

In some examples of the various embodiments, the port configuration table can contain at least one of a cable vendor, a part number, a cable type, and a speed for each port in the switch device.

In some examples of the various embodiments, obtaining features of the at least one cable can further comprise using the cable identification tool to retrieve stored cable features from a memory module of the cable. The stored cable features of the cable can include at least one of a cable type, a cable length, a cable vendor, a part number, and a speed.

In some examples of the various embodiments, the switch device can further comprise a notification device, such as a light emitting diode (LED). The notification device can be configured to generate at least one of the one or more notifications.

In some examples of the various embodiments, generating one or more notifications can further comprise determining that the comparison result shows that the obtained features of the at least one cable match a port in the switch device. The port can be a port to which the at least one cable is attached. The cable identification tool can then configure the LED to provide a first color.

In some examples of the various embodiments, generating one or more notifications can further comprise determining that the comparison result shows that the obtained features of the at least one cable do not match a port in the switch device. The port can be a port to which the at least one cable is attached. The cable identification tool can then configure the LED to provide a second color different than the first color.

In some examples of the various embodiments, obtaining the features of the at least one cable can comprise creating a table of detected features of the at least one cable. The table can be stored in a memory module of the switch device.

The words "computer system," "computing system," and "server system" are all used interchangeably in the present disclosure, and can identify any electronic computing system for storing and processing data. Such an electronic computing system can include, but not be limited to, a personal computer, a laptop computer, a tablet, and a commercial or private server system.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1A:
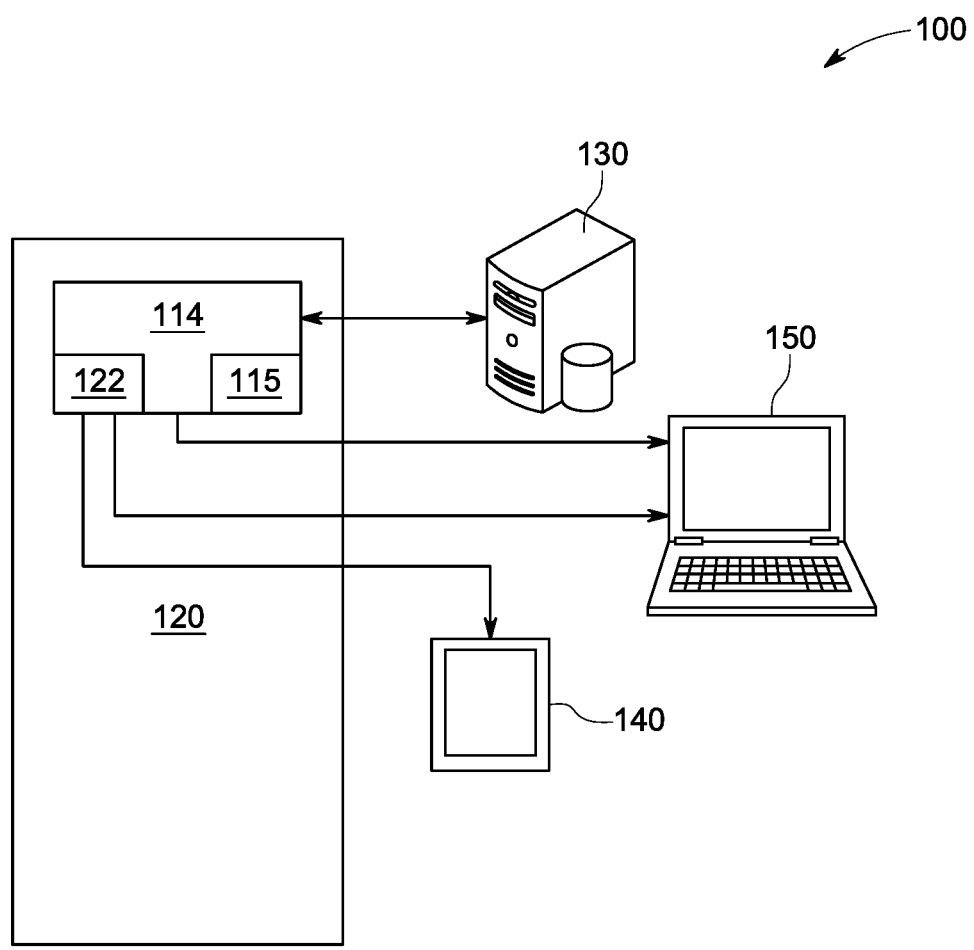
FIG. 1A shows an exemplary system according to an embodiment of the present disclosure.

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure is directed to a switch device which includes a cable identification tool. The cable identification tool can receive a port configuration table from a management device and obtain features of at least one cable attached to a port of the switch device. The cable identification tool can compare the obtained features with a table entry in the port configuration table to determine a match status of the at least one cable to the port. The cable identification tool can thus accurately identify whether an incorrect cable is attached to a port on the switch device. The cable identification tool can eliminate errors and transmission failures that occur when a cable is attached to an incorrect port on the switch device. The cable identification tool can also provide for sending notifications to a user when an incorrect cable is attached. Therefore, the present application provides for an instant identification of an incorrect cable which allows the user to correct the cables.

Figure 1B:
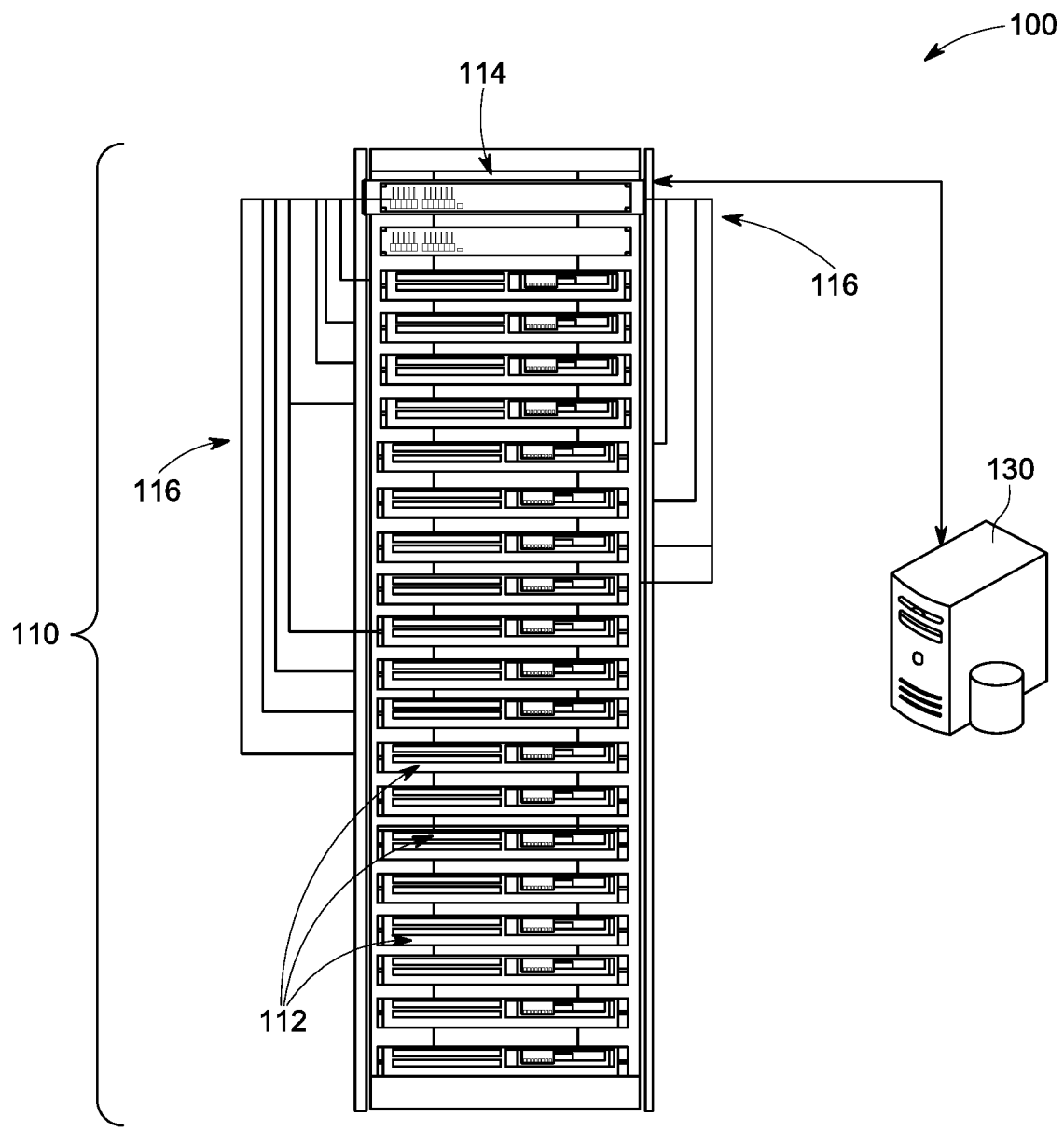
FIG. 1B shows an exemplary server rack system according to an embodiment of the present disclosure.

FIGS. 1A and 1B show an exemplary system 100 according to an embodiment of the present disclosure. FIG. 1A shows system 100 schematically, and FIG. 1B shows an implementation of system 100. System 100 can include a server rack system 120; a switch device 114; an optical cable identification tool 115; an accessory port 122; a management device 130; a mobile device 140; and an external computing device 150.

The server rack system 120 can be a rack with a plurality of servers stacked inside the rack. The server rack system 120 can contain a switch device 114. The switch device 114 can have at least one port (not pictured), where the port is configured to receive a cable. The switch device 114 can have a subset of ports configured to receive certain cable types. For example, some ports can receive cables from servers in the server rack system 120. Other ports can receive cables from an external data center. Other ports can be configured to receive cables from a management device 130. Other ports can connect to an external computing device 150. For example, the switch device can have the following ports: 10/100/1000/10G/40G/100G/400G ports. In some cases, a port can fan out into other ports. For example, a 40G port can fan out into a four 10G ports, a 100G port can fan out into four 25G ports.

The switch device 114 can incorporate an optical cable identification tool 115, according to an embodiment of the present disclosure. The optical identification tool 115 can be implemented in the switch device 114 as software, hardware, or a combination of both. The optical cable identification tool 115 can interact with the management device 130, the mobile device 140, and the external computing device 150 through the switch device 114.

The optical cable identification tool 115 in the switch device 114 can be configured to send and receive data from the management device 130. This configuration can be through a port, other wired connection, or through a wireless connection. The optical cable identification tool 115 of the switch device 114 can receive a port configuration table from the management device 130. The optical cable identification tool 115 of the switch device 114 can use the port configuration table to determine whether features of a cable attached to a port of the switch device 114 align with a data entry corresponding to the port in the port configuration table. The port configuration table and operation of the optical cable identification tool 115 will be described will be discussed in further detail below.

In some examples, the switch device 114 can include devices for generation of notifications for users (hereinafter "notification devices"). For example, notification devices can include a light emitting diode (LED) or other devices for visually generating notifications. The optical cable identification tool 115 of the switch device 114 can operate the notification devices in response to determining whether a cable is properly attached to the switch device 114. For example, if the switch device 114 determines that a cable is properly attached, the switch device 114 can turn a LED a first color. The first color can be green. If the switch device 114 determines that a cable is improperly attached, the switch device 114 can turn the LED a second color that is different from the first color (for example, red). Notification devices are not limited solely to visual notification devices. Rather, the present disclosure contemplates that notification devices can be visual, auditory, tactile, haptic, or any combination thereof.

The switch device 114 can contain an accessory port 122 configured to connect an electronic device from a user. For example, the accessory port 122 can receive a USB device with notification devices installed thereon; a cable to connect to a mobile device 140; a cable to connect to an external computing device 150; or any similar component. Through the accessory port 122, the switch device 114 can communicate to the external computing device 150 and the mobile device 140. For example, the optical cable identification tool 115 in the switch device 114 can send a positive or negative notification through the accessory port 122. The positive or negative notification can correspond to whether a cable is properly attached to the switch device 114.

In some examples of the present disclosure, a mobile device 140 or an external computing device 150 can be configured with an application to detect whether a positive or negative notification is received from the switch device 114. If a negative notification is received, the mobile device 140 or the external computing device 150 can alert a user of the mobile device 140 that a certain cable in the rack system 120 needs to be corrected. If a positive notification is received, the mobile device 140 or the external computing device 150 can alert a user that a certain cable in the rack system 120 is appropriately connected. For example, the application can be configured to generate visual, auditory, tactile, or haptic responses in each scenario.

In some examples, the management device 130 can be configured to notify an external system based on whether a positive or negative notification is received from the switch device 114.

As shown in FIG. 1B, the system 100 can also include a server rack 110 for housing servers and can also include cables 116 that couple the switch 114 to the servers 112. The cables 116 can be SFP cables, SFP+ cables, SFP 28 cables, QSFP cables, ZSFP+ cables, QSFP-DD cables, QSFP+ cables, QFSP28 cables, or any cables configured to connect a server to a switch device 114, such that the switch device 114 can transmit information to a server 112 and receive information from a server 112. For example, a SFP cable can connect to a 1G port; an SFP+ cable to a 10G port; an SFP28 cable to a 25G port; an QSFP cable to a 40G port; an QSFP+ cable to a 50G or 100G port; and a QSFP-DD to a 400G port.

The cables 116 can be optical cables. The cables 116 can contain a memory module which holds details on features of the cable. For example, the memory can be an electrically erasable programmable read-only memory (EEPROM). The EEPROM can store cable features including at least one of a cable type, a cable length, a cable vendor, a part number, and a speed. As previously discussed, the switch device 114 is configured to communicate with management device 130 to obtain instructions for the switch device 114. The management device 130 can also provide a cable identification table to the switch device 114, which can contain data about which ports of the switch device 114 accept which types of cables 116. The switch device 114 can use the cable identification table to determine whether or not a cables 116 are incorrectly installed. This process is described in further detail with respect to FIG. 2.

Figure 2:
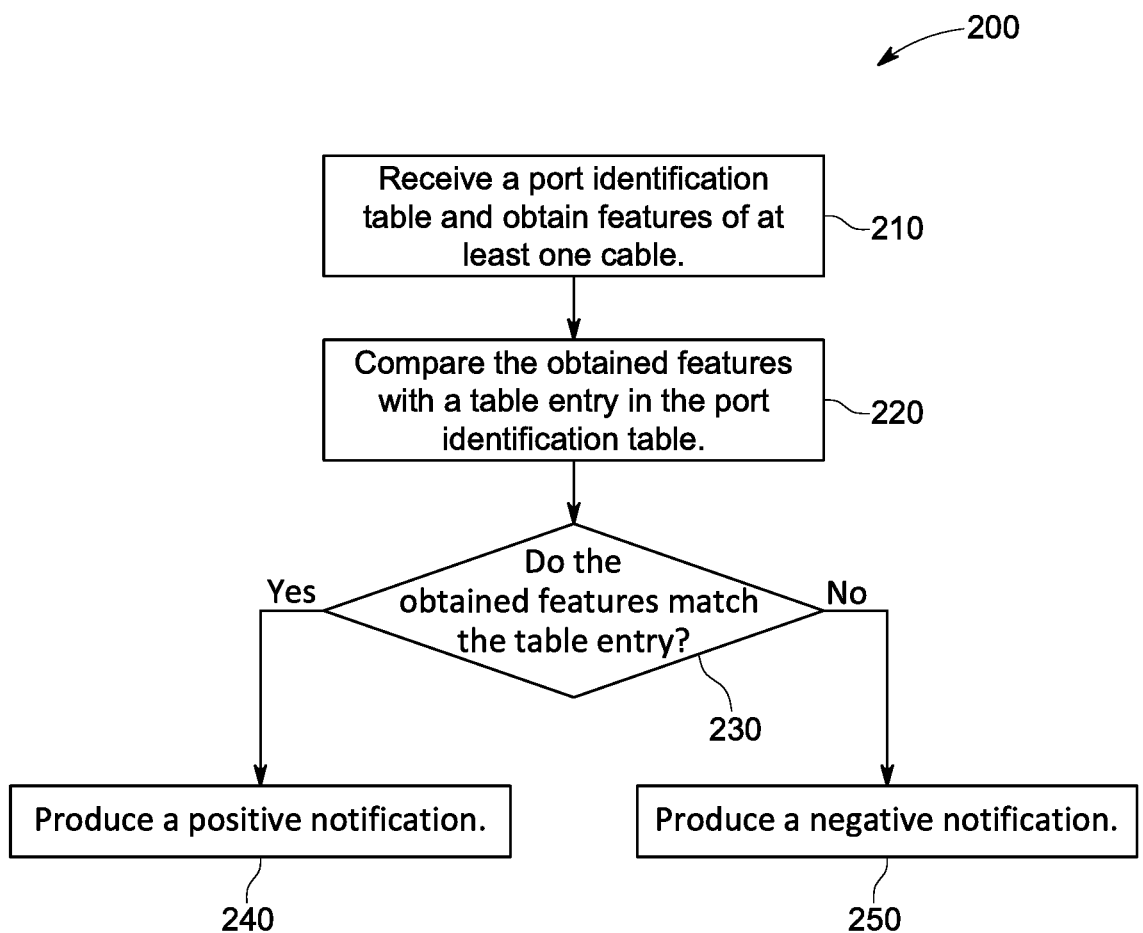
FIG. 2 shows an exemplary flowchart of a method for determining whether an optical cable matches a port in a switch device, according to an embodiment of the present disclosure.

FIG. 2 shows an exemplary flowchart of a method 200 for determining whether a cable matches a port in a switch device, according to an embodiment of the present disclosure. This method 200 can be triggered at any time. For example, the method 200 can be initiated when a rack system boots up; initiated by a user or a management device commanding the switch device to check attached cable; initiated with a rack test program; or initiated when a cable is plugged into the switch device. The method 200 can be performed by an optical cable identification tool on a switch device in a rack system, such as optical cable identification tool 115 in switch device 114 of FIGS. 1A and 1B.

In FIG. 2, the method 200 can begin in step 210 when the optical identification tool receives a port configuration table from a management device. For example, as shown in FIG. 1A, the optical identification tool 115 can receive a port configuration table from management device 130. The port configuration table can contain information on what cables each port is configured to receive. For example, as shown in FIG. 1B, a switch device 115 can have a plurality of ports, and each port can be configured to receive certain types of cables. Therefore, an exemplary port configuration table, according to an embodiment of the present disclosure, can identify a port number and specify what features a cable needs to have in order to operate properly with that port number. For example, a port configuration table can contain information on a cable vendor, a part number, a cable type, and a speed for each port in the switch device. An exemplary port configuration table is shown below in Table 1.

TABLE 1

Exemplary Port Configuration Table

| Port Identification | Cable Vendor | Part Number | Cable Type | Speed |
| --- | --- | --- | --- | --- |
| 1 | Finisar | MPM008V | DAC | 10G SFP+ |
| 2 | Finisar | MPM009V | AOC | 40G QSFP+ |

The optical cable identification tool can also obtain features of at least one cable attached to a port in the switch device in step 210 of FIG. 2. The optical cable identification tool can receive a port identification table and obtain features of at least one attached cable in any order. The optical cable identification tool can obtain features of an attached cable by interfacing with a memory module on the cable. For example, the cable can have an EEPROM which stores information on features of the cable. Stored feature information can include a cable type, a cable length, a cable vendor, a part number, and a speed. The optical cable identification tool can retrieve these and any other stored features from the EEPROM on the cable.

In some examples of the present disclosure, step 210 can include creating a table of detected features of the at least one cable. The optical cable identification tool can create this table of the obtained features of the at least one cable to be in the same format as the port configuration table received from the management device.

After obtaining the features of the at least one cable, the optical cable identification tool can compare the obtained features with a table entry in the port identification table at step 220. The table entry can correspond to the port to which the at least one cable is attached.

After comparing the table entry and the obtained features in step 220, the optical cable identification tool can determine whether the obtained features match the table entry in step 230. If the obtained features do match the table entry, the optical cable identification tool can proceed to step 240 and produce a positive notification. If the obtained features do not match the table entry, the optical cable identification tool can proceed to step 250 and produce a negative notification.

The notification produced by the optical cable identification tool can be operating a light on the switch device. The switch device can be configured to operate the LED in response to the comparison. For example, a positive notification can turn an LED a first color on the switch device and a negative notification can turn an LED a second color on the switch device. For example, the first color can be green and the second color can be red. However, any colors can be used, without limitation. In some examples of the present disclosure, the positive or negative notification can be sent to an administrator's computer to identify whether the cable usage is proper or improper. In other examples, an alert can be sent to a mobile device of a rack system operator. However, as previously noted, the present disclosure is not limited to any particular type of notification device.

In some examples, an all network alert can be implemented such that all external devices connected to the switch device can receive the notifications. In some examples, the switch device can use a file handshake operation to exchange notifications with the management device. In some examples, notifications can be sent via a simple network management protocol (SNMP) or a simple mail transfer protocol (SMTP).

The flow diagrams in FIG. 2 are representative of example machine readable instructions for the system 100 in FIGS.

1A-1B. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 2, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A switch device, comprising:
    first cable port configured to receive cables having specific features, the specific features including a desired cable type and a desired speed;
    a first cable coupled to the first cable port, the first cable storing information on features of the first cable, the features of the first cable including an actual cable type and an actual speed; and
    a cable identification tool communicatively coupled to a management device, wherein the cable identification tool is configured to:
        receive a port configuration table from the management device, the port configuration table comprising a plurality of table entries, a first table entry of the plurality of table entries being associated with the first cable port and including fields representative of the specific features of the cables that the first cable port is configured to receive, the fields including the desired cable type and the desired speed associated with the first cable port;
        obtain the features of the first cable coupled to the first cable port of the switch device;
        create a cable configuration table having a plurality of table entries, the plurality of table entries of the cable configuration table including a first table entry associated with the first cable port, the first table entry of the cable configuration table including fields representative of the obtained features of the first cable, the fields of the first table entry of the cable configuration table including the actual cable type and the actual speed of the first cable;
        store the created cable configuration table in a memory module of the switch device;
        compare the obtained features of the first cable with the first table entry of the plurality of table entries in the port configuration table to yield a comparison result; and
        based on the comparison result being indicative that the obtained features of the first cable match the first table entry, generate a notification indicative of a match status of the first cable to the first cable port.

2. The switch device of claim 1, wherein the specific features associated with the first cable port further include a desired cable vendor and a desired part number, and wherein the fields of the first table entry of the port configuration table further include the desired cable vendor and the desired part number.

3. The switch device of claim 1, wherein obtaining the features of the first cable comprises retrieving the stored information on the features of the first cable from a memory module of the first cable.

4. The switch device of claim 1, further comprising an accessory port configured to couple to a notification device, wherein the cable identification tool is configured to transmit the notification, via the accessory port, to the notification device.

5. The switch device of claim 4, wherein the notification is either a positive or a negative notification, wherein the notification device comprises a light emitting diode (LED), and wherein the cable identification tool is configured to, based on the comparison result being indicative that the obtained features of the first cable match the first table entry, cause the LED of the notification device to provide a first color associated with the positive notification.

6. The switch device of claim 5, wherein the cable identification tool is configured to, based on the comparison result being indicative that the obtained features of the first cable do not match the first table entry, cause the LED of the notification device to provide a second color different from the first color.

7. A method for identifying a match status of at least one cable coupled to a switch device by a cable identification tool within the switch device, comprising:
receiving a port configuration table from a management device, the port configuration table comprising a plurality of table entries, a first table entry of the plurality of table entries being associated with a first cable port of a plurality of ports of the switch device, the first table entry including fields representative of specific features of cables that the first cable port is configured to receive, the fields including a desired cable type and a desired speed;
obtaining features of a first cable coupled to the first cable port, the first cable storing information on features of the first cable, the features of the first cable including an actual cable type and an actual speed;
creating a cable configuration table having a plurality of table entries, the plurality of table entries of the cable configuration table including a first table entry associated with the first cable port, the first table entry of the cable configuration table including fields representative of the obtained features of the first cable, the fields of the first table entry of the cable configuration table including the actual cable type and the actual speed of the first cable;
storing the created cable configuration table in a memory module of the switch device;
comparing the obtained features of the first cable with the first table entry of the plurality of table entries in the port configuration table to yield a comparison result; and
based on the comparison result being indicative that the obtained features of the first cable match the first table entry, generating a notification indicative of a match status of the first cable to the first cable port.

8. The method of claim 7, wherein the specific features associated with the first cable port further include a desired cable vendor and a desired part number, and wherein the fields of the first table entry of the port configuration table further include the desired cable vendor and the desired part number.

9. The method of claim 7, wherein obtaining the features of the first cable comprises retrieving the stored information on the features of the first cable from a memory module of the first cable.

10. The method of claim 7, further comprising transmitting the notification, via an accessory port of the switch device, to a notification device.

11. The method of claim 10, wherein the notification device comprises a light emitting diode (LED), and wherein the method further comprises:
based on the comparison result being indicative that the obtained features of the first cable match the first table entry, causing the LED to provide a first color.

12. The method of claim 11, comprising:
based on the comparison result being indicative that the obtained features of the first cable do not match the first table entry, causing the LED to provide a second color different from the first color.

13. A non-transitory machine-readable medium having stored thereon instructions for performing a method of identifying a match status of at least one cable coupled to a switch device by a cable identification tool within the switch device, the non-transitory machine-readable medium comprising machine executable code which, when executed by at least one machine, causes the cable identification tool to:
receive a port configuration table from a management device, the port configuration table comprising a plurality of table entries, a first table entry of the plurality of table entries being associated with a first cable port of a plurality of ports of the switch device, the first table entry including fields representative of specific features of cables that the first cable port is configured to receive, the fields including a desired cable type and a desired speed;
obtain features of a first cable coupled to the first cable port, the first cable storing information on features of the first cable, the features of the first cable including an actual cable type and an actual speed;
create a cable configuration table having a plurality of table entries, the plurality of table entries of the cable configuration table including a first table entry associated with the first cable port, the first table entry of the cable configuration table including fields representative of the obtained features of the first cable, the fields of the first table entry of the cable configuration table including the actual cable type and the actual speed of the first cable;
store the created cable configuration table in a memory module of the switch device;
compare the obtained features of the first cable with the first table entry of the plurality of table entries in the port configuration table to yield a comparison result; and
based on the comparison result being indicative that the obtained features of the first cable match the first table entry, generate a notification indicative of a match status of the first cable to the first cable port.

14. The non-transitory machine-readable medium of claim 13, wherein the specific features associated with the first cable port further include a desired cable vendor and a desired part number, and wherein the fields of the first table entry of the port configuration table further include the desired cable vendor and the desired part number.

15. The non-transitory machine-readable medium of claim 13, wherein obtaining the features of the first cable comprises retrieving the stored information on the features of the first cable from a memory module of the first cable.

16. The non-transitory machine-readable medium of claim 13, wherein the machine is further caused to transmit the notification, via an accessory port of the switch device, to a notification device.

17. The non-transitory machine-readable medium of claim 13, wherein the notification device comprises a light emitting diode (LED), and wherein the machine is further caused to, based on the comparison result being indicative that the obtained features of the first cable match the first table entry, cause the LED to provide a first color.

18. The non-transitory machine-readable medium of claim 17, wherein the machine is further caused to, based on the comparison result being indicative that the obtained features of the first cable do not match the first table entry, cause the LED to provide a second color different from the first color.

* * * * *